United States Patent [19]

Minor

[11] Patent Number: 5,441,659
[45] Date of Patent: Aug. 15, 1995

[54] COMPOSITIONS INCLUDING A FLUOROAMINE AND A SECOND COMPONENT

[75] Inventor: Barbara H. Minor, Elkton, Md.

[73] Assignee: E. I. Du Pont de Nemours and Company, Wilmington, Del.

[21] Appl. No.: 150,904

[22] Filed: Nov. 12, 1993

[51] Int. Cl.$^6$ ................................................ C09K 5/04
[52] U.S. Cl. ................................. 252/67; 252/162; 252/172; 252/DIG. 9; 252/544; 252/364; 252/77; 203/67; 203/59; 203/70; 62/324.1; 62/324.4; 62/114
[58] Field of Search .................... 252/162, 172, 67, 68, 252/71, 77, 544, DIG. 9, 364, 374, 8; 203/67, 59, 70; 62/324.1, 324.4, 114

[56] References Cited

U.S. PATENT DOCUMENTS

| | | | |
|---|---|---|---|
| 3,407,232 | 10/1968 | Mitsch | 252/67 X |
| 4,482,465 | 11/1984 | Gray | 252/67 |
| 4,541,943 | 9/1985 | Powell | 252/67 |
| 5,053,155 | 10/1991 | Mahler | 252/67 X |
| 5,182,040 | 1/1993 | Bartlett et al. | 252/67 |

FOREIGN PATENT DOCUMENTS

WO94/02563 2/1994 WIPO.
WO94/09083 4/1994 WIPO.
WO94/11460 5/1994 WIPO.

OTHER PUBLICATIONS

Powell, R. L., "Heat Pumps", *Energy Abstract*, acc. No. 89(2):7795, CA 1,244,237, Nov. 1988.

*Primary Examiner*—Paul Lieberman
*Assistant Examiner*—Douglas J. McGinty

[57] ABSTRACT

Compositions of $N(CF_3)_a(CHF_2)_b(CH_2F)_c$, where a, b and c are integers from 0 to 3 and $a+b+c=3$, and $C_nF_mH_{2n+2-m}$, where n is an integer from 1 to 3 and m is an integer from 1 to 8, are disclosed. Also disclosed are compositions of $N(CF_3)_3$ and butane, cyclopropane, dimethyl ether or isobutane. These compositions are useful as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

3 Claims, No Drawings

COMPOSITIONS INCLUDING A FLUOROAMINE AND A SECOND COMPONENT

FIELD OF THE INVENTION

This invention relates to compositions that include a fluoroamine as a component. These compositions are useful as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Compositions which do not include chlorine or bromine have been suggested as replacements for CFCs and HCFCs since HFCs have no chlorine and therefore have zero ozone depletion potential.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable to use as a refrigerant a pure compound or an azeotropic or azeotrope-like composition of compounds that do not contain chlorine or bromine, such as fluorinated amines, fluorinated hydrocarbons, ethers or hydrocarbons.

Fluorinated amines, fluorinated hydrocarbons, ethers and hydrocarbons may also be used cleaning agents or solvents to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated amines, fluorinated hydrocarbons, ethers or hydrocarbons fluorinated hydrocarbon or a fluorinated amine are also useful as blowing agents in the manufacture of closed-cell polyurethane, phenolic and thermoplastic foams, as propellants in aerosols, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to the discovery of compositions of $N(CF_3)_a(CHF_2)_b(CH_2F)_c$, where a, b and c are integers from 0 to 3 and $a+b+c=3$, and $C_nF_mH_{2n+2-m}$, where n is an integer from 1 to 3 and m is an integer from 1 to 8. Compositions of the present invention include compositions of tris(trifluoromethyl)amine ($N(CF_3)_3$) and trifluoromethane (HFC-23), difluoromethane (HFC-32), 1,1,1,2-tetrafluoroethane (HFC-134a), 1,1-difluoroethane (HFC-152a), fluoroethane (HFC-161), 1,1,1,2,2,3-hexafluoropropane (HFC-236cb), 1,1,2,3,3,3-hexafluoropropane (HFC-236ea), 1,1,1,3,3,3-hexafluoropropane (HFC-236fa), 1,1,1,3,3-pentafluoropropane (HFC-245fa), 1,2,2,3-tetrafluoropropane (HFC-254ca), 1,1,2,2-tetrafluoropropane (HFC-254cb), 1,1,1,2-tetrafluoropropane (HFC-254eb), 1,2,2-trifluoropropane (HFC-263ca), 1,1,1-trifluoropropane (HFC-263fb), 2,2-difluoropropane (HFC-272ca), 1,2-difluoropropane (HFC-272ea), 1,1-difluoropropane (HFC-272fb), 2-fluoropropane (HFC-281ea) or 1-fluoropropane (HFC-281fa); bis(difluoromethyl)trifluoromethylamine ($N(CHF_2)_2(CF_3)$) and 1,1,2,2,3-pentafluoropropane (HFC-245ca), 1,1,2,3,3-pentafluoropropane (HFC-245ea), 1,1,1,2,3-pentafluoropropane (HFC-245eb), 1,2,2,3-tetrafluoropropane (HFC-254ca), 1,2,2-trifluoropropane (HFC-263ca) or 1,2-difluoropropane (HFC-272ea); and fluoromethylbis(trifluoromethyl)amine ($N(CH_2F)(CF_3)_2$) and 1,1,2,2,3-pentafluoropropane (HFC-245ca), 1,1,2,3,3-pentafluoropropane (HFC-245ea), 1,2,2,3-tetrafluoropropane (HFC-254ca), 1,2,2-trifluoropropane (HFC 263ca) or 1,2-difluoropropane (HFC-272ea). Further, the invention relates to compositions of $N(CF_3)_3$ and butane, cyclopropane, dimethylether (DME) or isobutane.

These compositions are useful as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

Further, the invention relates to the discovery of azeotropic or azeotrope-like compositions comprising effective amounts of $N(CF_3)_a(CHF_2)_b(CH_2F)_c$, where a, b and c are integers from 0 to 3 and $a+b+c=3$, and $C_nF_mH_{2n+2-m}$, where n is an integer from 1 to 3 and m is an integer from 1 to 8, to form an azeotropic or azeotrope-like composition. Azeotropic or azeotrope-like compositions of this invention include effective amounts of $N(CF_3)_3$ and HFC-23, HFC-32, HFC-134a, HFC-152a, HFC-161, HFC-236cb, HFC-236ea, HFC-236fa, HFC 245fa, HFC-254ca, HFC 254cb, HFC-254eb, HFC-263ca, HFC-263fb, HFC-272ca, HFC-272ea, HFC-272fb, HFC-281ea or HFC-281fa;

N(CHF$_2$)$_2$(CF$_3$) and HFC-245ca, HFC-245ea, HFC-245eb, HFC-254ca, HFC-263ca or HFC-272ea; N(CH$_2$F)(CF$_3$)$_2$ and HFC-245ca, HFC-245ea, HFC-254ca, HFC-263ca or HFC-272ea; and N(CF$_3$)$_3$ and butane, cyclopropane, DME or isobutane to form an azeotropic or azeotrope-like composition.

DETAILED DESCRIPTION

The present invention relates to compositions of N(CF$_3$)$_a$(CHF$_2$)$_b$(CH$_2$F)$_c$, where a, b and c are integers from 0 to 3 and a+b+c=3, and C$_n$F$_m$H$_{2n+2-m}$, where n is an integer from 1 to 3 and m is an integer from 1 to 8. Compositions of the present invention include compositions of N(CF$_3$)$_3$ and HFC-23, HFC-32, HFC-134a, HFC-152a, HFC-161, HFC-236cb, HFC-236ea, HFC-236fa, HFC 245fa, HFC-254ca, HFC 254cb, HFC-254eb, HFC-263ca, HFC-263fb, HFC-272ca, HFC-272ea, HFC-272fb, HFC-281ea or HFC-281fa; N(CHF$_2$)$_2$(CF$_3$) and HFC-245ca, HFC-245ea, HFC-245eb, HFC-254ca, HFC-263ca or HFC-272ea; N(CH$_2$F)(CF$_3$)$_2$ and HFC-245ca, HFC-245ea, HFC-254ca, HFC-263ca or HFC-272ea; and N(CF$_3$)$_3$ and butane, cyclopropane, DME or isobutane.

The present invention also relates to the discovery of azeotropic or azeotrope-like compositions of effective amounts of N(CF$_3$)$_a$(CHF$_2$)$_b$(CH$_2$F)$_c$, where a, b and c are integers from 0 to 3 and a+b+c=3, and C$_n$F$_m$H$_{2n+2-m}$, where n is an integer from 1 to 3 and m is an integer from 1 to 8, to form an azeotropic or azeotrope-like composition. Azeotropic or azeotrope-like compositions of this invention include effective amounts of N(CF$_3$)$_3$ and HFC-23, HFC-32, HFC-134a, HFC-152a, HFC-161, HFC-236cb, HFC-236ea, HFC-236fa, HFC 245fa, HFC-254ca, HFC 254cb, HFC-254eb, HFC-263ca, HFC-263fb, HFC-272ca, HFC-272ea, HFC-272fb, HFC-281ea or HFC-281fa; N(CHF$_2$)$_2$(CF$_3$) and HFC-245ca, HFC-245ea, HFC-245eb, HFC-254ca, HFC-263ca or HFC-272ea; N(CH$_2$F)(CF$_3$)$_2$ and HFC-245ca, HFC-245ea, HFC-254ca, HFC-263ca or HFC-272ea; and N(CF$_3$)$_3$ and butane, cyclopropane, DME or isobutane to form an azeotropic or azeotrope-like composition.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of N(CF$_3$)$_a$(CHF$_2$)$_b$(CH$_2$F)$_c$, where a, b and c are integers from 0 to 3 and a+b+c=3, and C$_n$F$_m$H$_{2n+2-m}$, where n is an integer from 1 to 3 and m is an integer from 1 to 8, including effective amounts of N(CF$_3$)$_3$ and HFC-23, HFC-32, HFC-134a, HFC-152a, HFC-161, HFC-236cb, HFC-236ea, HFC-236fa, HFC 245fa, HFC-254ca, HFC 254cb, HFC-254eb, HFC-263ca, HFC-263fb, HFC-272ca, HFC-272ea, HFC-272fb, HFC-281ea or HFC-281fa; N(CHF$_2$)$_2$(CF$_3$) and HFC-245ca, HFC-245ea, HFC-245eb, HFC-254ca, HFC-263ca or HFC-272ea; N(CH$_2$F)(CF$_3$)$_2$ and HFC-245ca, HFC-245ea, HFC-254ca, HFC-263ca or HFC-272ea; and N(CF$_3$)$_3$ and butane, cyclopropane, DME or isobutane; such that after 50 weight percent of an original composition is evaporated or boiled off to produce a remaining composition, the difference in the vapor pressure between the original composition and the remaining composition is 10 percent or less.

The components of the compositions of this invention have the following vapor pressures at 25° C.

| COMPONENTS | PSIA | KPA |
| --- | --- | --- |
| HFC-23 | 665.5 | 4588 |
| HFC-32 | 246.7 | 1701 |
| HFC-134a | 98.3 | 677 |
| HFC-152a | 85.8 | 591 |
| HFC-161 | 130.2 | 898 |
| HFC-236cb | 33.6 | 232 |
| HFC-236ea | 29.8 | 206 |
| HFC-236fa | 39.4 | 271 |
| HFC-245fa | 21.6 | 149 |
| HFC-254ca | 13.7 | 95 |
| HFC-254cb | 34.2 | 236 |
| HFC-254eb | 34.7 | 240 |
| HFC-263ca | 18.2 | 126 |
| HFC-263fb | 54.0 | 372 |
| HFC-272ca | 34.5 | 238 |
| HFC-272ea | 20.8 | 143 |
| HFC-272fb | 26.5 | 182 |
| N(CF$_3$)$_3$ | 45.8 | 316 |
| HFC-281ea | 47.1 | 325 |
| HFC-281fa | 37.7 | 260 |
| butane | 35.2 | 243 |
| cyclopropane | 105.0 | 724 |
| DME | 85.7 | 591 |
| isobutane | 50.5 | 348 |
| N(CHF$_2$)$_2$(CF$_3$) | 13.9 | 96 |
| HFC-245ca | 14.2 | 98 |
| HFC-245ea | 14.2 | 98 |
| HFC-245eb | 16.9 | 117 |
| N(CH$_2$F)(CF$_3$)$_2$ | 14.2 | 98 |

Substantially constant boiling, azeotropic or azeotrope-like compositions of this invention comprise the following (all compositions are measured at 25° C.):

| COMPONENTS | WEIGHT RANGES (wt. %/wt/%) | PREFERRED (wt. %/wt. %) |
| --- | --- | --- |
| N(CF$_3$)$_3$/HFC-23 | 1-47/53-99 | 1-40/60-99 |
| N(CF$_3$)$_3$/HFC-32 | 20-74/26-80 | 20-74/26-80 |
| N(CF$_3$)$_3$/HFC-134a | 1-66/34-99 | 1-60/40-99 |
| N(CF$_3$)$_3$/HFC-152a | 1-78/22-99 | 30-78/22-70 |
| N(CF$_3$)$_3$/HFC-161 | 20-76/24-80 | 30-76/24-70 |
| N(CF$_3$)$_3$/HFC-236cb | 1-99/1-99 | 40-99/1-60 |
| N(CF$_3$)$_3$/HFC-236ea | 32-99/1-68 | 40-99/1-60 |
| N(CF$_3$)$_3$/HFC-236fa | 1-99/1-99 | 40-99/1-60 |
| N(CF$_3$)$_3$/HFC-245fa | 52-99.2/0.8-48 | 60-99.2/0.8-40 |
| N(CF$_3$)$_3$/HFC-254ca | 65-99.5/0.5-35 | 65-99.5/0.5-35 |
| N(CF$_3$)$_3$/HFC-254cb | 1-99/1-99 | 50-99/1-50 |
| N(CF$_3$)$_3$/HFC-254eb | 1-99/1-99 | 50-99/1-50 |
| N(CF$_3$)$_3$/HFC-263ca | 60-99/1-40 | 80-99/1-80 |
| N(CF$_3$)$_3$/HFC-263fb | 1-99/1-99 | 40-99/1-60 |
| N(CF$_3$)$_3$/HFC-272ca | 44-99/1-56 | 50-99/1-50 |
| N(CF$_3$)$_3$/HFC-272ea | 62-99/1-38 | 70-99/1-30 |
| N(CF$_3$)$_3$/HFC-272fb | 56-99/1-44 | 70-99/1-30 |
| N(CF$_3$)$_3$/HFC-281ea | 39-99/1-61 | 50-99/1-50 |
| N(CF$_3$)$_3$/HFC-281fa | 48-99/1-52 | 50-99/1-50 |
| N(CF$_3$)$_3$/butane | 1-99/1-99 | 70-99/1-30 |
| N(CF$_3$)$_3$/cyclopropane | 1-80/20-99 | 20-80/20-80 |
| N(CF$_3$)$_3$/DME | 30-83/17-70 | 40-83/17-60 |
| N(CF$_3$)$_3$/isobutane | 1-99/1-99 | 40-99/1-60 |
| N(CHF$_2$)$_2$(CF$_3$)/HFC-245ca | 1-99/1-99 | 25-75/25-75 |
| N(CHF$_2$)$_2$(CF$_3$)/HFC-245ea | 1-99/1-99 | 25-75/25-75 |
| N(CHF$_2$)$_2$(CF$_3$)/HFC-245eb | 1-99/1-99 | 1-99/1-99 |
| N(CHF$_2$)$_2$(CF$_3$)/HFC-254ca | 1-99/1-99 | 40-99/1-60 |
| N(CHF$_2$)$_2$(CF$_3$)/HFC-263ca | 1-99/1-99 | 15-99/1-85 |
| N(CHF$_2$)$_2$(CF$_3$)/HFC-272ea | 1-99/1-99 | 10-99/1-90 |
| N(CH$_2$F)(CF$_3$)$_2$/HFC-245ca | 1-99/1-99 | 40-99/1-60 |
| N(CH$_2$F)(CF$_3$)$_2$/HFC-245ea | 1-99/1-99 | 40-99/1-60 |
| N(CH$_2$F)(CF$_3$)$_2$/HFC-254ca | 1-99/1-99 | 40-99/1-60 |
| N(CH$_2$F)(CF$_3$)$_2$/HFC-263ca | 1-99/1-99 | 10-99/1-90 |
| N(CH$_2$F)(CF$_3$)$_2$/HFC-272ea | 1-99/1-99 | 10-99/1-90 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study shows the following compositions are azeotropic. The temperature is 25° C.

| Composition | Weight Percents | Vapor Press. psia | Vapor Press. kPa |
| --- | --- | --- | --- |
| N(CF$_3$)$_3$/HFC-23 | 4.3/95.7 | 668.5 | 4609 |
| N(CF$_3$)$_3$/HFC-32 | 35.0/65.0 | 277.2 | 1911 |
| N(CF$_3$)$_3$/HFC-134a | 27.7/72.3 | 103.8 | 716 |
| N(CF$_3$)$_3$/HFC-152a | 49.2/50.8 | 101.0 | 696 |
| N(CF$_3$)$_3$/HFC-161 | 45.7/54.3 | 148.3 | 1022 |
| N(CF$_3$)$_3$/HFC-236cb | 88.2/11.8 | 46.2 | 319 |
| N(CF$_3$)$_3$/HFC-236ea | 82.2/17.8 | 47.4 | 327 |
| N(CF$_3$)$_3$/HFC-236fa | 66.9/33.1 | 50.0 | 345 |
| N(CF$_3$)$_3$/HFC-245fa | 99.2/0.8 | 45.8 | 316 |
| N(CF$_3$)$_3$/HFC-254ca | 99.5/0.5 | 45.8 | 316 |
| N(CF$_3$)$_3$/HFC-254cb | 79.5/20.5 | 48.4 | 334 |
| N(CF$_3$)$_3$/HFC-254eb | 78.7/21.3 | 48.5 | 334 |
| N(CF$_3$)$_3$/HFC-263ca | 92.7/7.3 | 46.8 | 323 |

-continued

| Composition | Weight Percents | Vapor Press. psia | kPa |
|---|---|---|---|
| N(CF$_3$)$_3$/HFC-263fb | 49.1/50.9 | 58.0 | 400 |
| N(CF$_3$)$_3$/HFC-272ca | 78.3/21.7 | 52.9 | 365 |
| N(CF$_3$)$_3$/HFC-272ea | 90.2/9.8 | 48.3 | 333 |
| N(CF$_3$)$_3$/HFC-272fb | 86.2/13.8 | 49.6 | 342 |
| N(CF$_3$)$_3$/HFC-281ea | 71.2/28.8 | 59.3 | 409 |
| N(CF$_3$)$_3$/HFC-281fa | 79.3/20.7 | 55.5 | 383 |
| N(CF$_3$)$_3$/butane | 89.2/10.8 | 47.8 | 330 |
| N(CF$_3$)$_3$/cyclopropane | 38.3/61.7 | 108.3 | 747 |
| N(CF$_3$)$_3$/DME | 59.0/41.0 | 102.9 | 709 |
| N(CF$_3$)$_3$/isobutane | 61.8/38.2 | 52.5 | 362 |
| N(CHF$_2$)$_2$(CF$_3$)/HFC-245ca | 50.4/49.6 | 15.0 | 103 |
| N(CHF$_2$)$_2$(CF$_3$)/HFC-245ea | 50.5/49.5 | 14.9 | 103 |
| N(CHF$_2$)$_2$(CF$_3$)/HFC-245eb | 3.3/96.7 | 16.9 | 117 |
| N(CHF$_2$)$_2$(CF$_3$)/HFC-254ca | 59.1/40.9 | 15.2 | 105 |
| N(CHF$_2$)$_2$(CF$_3$)/HFC-263ca | 27.6/72.4 | 18.6 | 128 |
| N(CHF$_2$)$_2$(CF$_3$)/HFC-272ea | 20.1/79.9 | 20.9 | 144 |
| N(CH$_2$F)(CF$_3$)$_2$/HFC-245ca | 54.7/45.3 | 15.0 | 103 |
| N(CH$_2$F)(CF$_3$)$_2$/HFC-245ea | 55.2/44.8 | 14.9 | 103 |
| N(CH$_2$F)(CF$_3$)$_2$/HFC-254ca | 62.4/37.6 | 15.2 | 105 |
| N(CH$_2$F)(CF$_3$)$_2$/HFC-263ca | 26.5/73.5 | 18.5 | 128 |
| N(CH$_2$F)(CF$_3$)$_2$/HFC-272ea | 17.0/83.0 | 20.9 | 144 |

EXAMPLE 2

Impact of Vapor Leakage on Vapor Pressure at 25° C.

A vessel is charged with an initial liquid composition at 25° C. The liquid, and the vapor above the liquid, are allowed to come to equilibrium, and the vapor pressure in the vessel is measured. Vapor is allowed to leak from the vessel, while the temperature is held constant at 25° C., until 50 weight percent of the initial charge is removed, at which time the vapor pressure of the composition remaining in the vessel is measured. The results are summarized below.

| Refrigerant Composition | 0 wt % evaporated psia | kPa | 50 wt % evaporated psia | kPa | 0% change in vapor pressure |
|---|---|---|---|---|---|
| N(CF$_3$)$_3$/HFC-23 | | | | | |
| 4.3/95.7 | 668.5 | 4609 | 668.5 | 4609 | 0.0 |
| 1/99 | 667.1 | 4600 | 666.6 | 4596 | 0.1 |
| 30/70 | 659.7 | 4548 | 644.9 | 4446 | 2.2 |
| 32/68 | 658.5 | 4540 | 640.7 | 4417 | 2.7 |
| 35/65 | 656.4 | 4526 | 633.2 | 4366 | 3.5 |
| 40/60 | 652.2 | 4497 | 616.9 | 4253 | 5.4 |
| 45/55 | 646.5 | 4457 | 594.7 | 4100 | 8.0 |
| 47/53 | 643.8 | 4439 | 583.8 | 4025 | 9.3 |
| 48/52 | 642.4 | 4429 | 577.8 | 3984 | 10.1 |
| N(CF$_3$)$_3$/HFC-32 | | | | | |
| 35/65 | 277.2 | 1911 | 277.2 | 1911 | 0.0 |
| 25/75 | 277.1 | 1911 | 277.0 | 1910 | 0.0 |
| 20/80 | 277.1 | 1911 | 259.9 | 1792 | 6.2 |
| 60/40 | 276.4 | 1906 | 273.0 | 1882 | 1.2 |
| 70/30 | 274.6 | 1893 | 260.8 | 1798 | 5.0 |
| 75/25 | 272.7 | 1880 | 243.2 | 1677 | 10.8 |
| 74/26 | 273.2 | 1884 | 248.0 | 1710 | 9.2 |
| N(CF$_3$)$_3$/HFC-134a | | | | | |
| 27.7/72.3 | 103.8 | 716 | 103.8 | 716 | 0.0 |
| 15/85 | 103.0 | 710 | 102.3 | 705 | 0.7 |
| 1/99 | 98.8 | 681 | 98.5 | 679 | 0.3 |
| 50/50 | 101.8 | 702 | 99.5 | 686 | 2.3 |
| 60/40 | 99.3 | 685 | 93.4 | 644 | 5.9 |
| 70/30 | 94.9 | 654 | 83.0 | 572 | 12.5 |
| 65/35 | 97.4 | 672 | 88.9 | 613 | 8.7 |
| 67/33 | 96.5 | 665 | 86.7 | 598 | 10.2 |
| 66/34 | 97.0 | 669 | 87.8 | 605 | 9.5 |
| N(CF$_3$)$_3$/HFC-152a | | | | | |
| 49.2/50.8 | 101.0 | 696 | 101.0 | 696 | 0.0 |
| 30/70 | 100.1 | 690 | 97.1 | 669 | 3.0 |
| 20/80 | 98.5 | 679 | 90.2 | 622 | 8.4 |
| 17/83 | 97.7 | 674 | 88.5 | 610 | 9.4 |
| 16/84 | 97.4 | 672 | 88.1 | 607 | 9.5 |
| 15/85 | 97.1 | 669 | 87.7 | 605 | 9.7 |
| 14/86 | 96.8 | 667 | 87.4 | 603 | 9.7 |
| 13/87 | 96.4 | 665 | 87.1 | 601 | 9.6 |
| 12/88 | 96.0 | 662 | 86.9 | 599 | 9.5 |
| 10/90 | 95.0 | 655 | 86.5 | 596 | 8.9 |
| 1/99 | 87.2 | 601 | 85.8 | 592 | 1.6 |
| 70/30 | 99.2 | 684 | 95.5 | 658 | 3.7 |
| 80/20 | 95.2 | 656 | 83.4 | 575 | 12.4 |
| 75/25 | 97.7 | 674 | 90.8 | 626 | 7.1 |
| 78/22 | 96.4 | 665 | 86.8 | 598 | 10.0 |
| N(CF$_3$)$_3$/HFC-161 | | | | | |
| 45.7/54.3 | 148.3 | 1022 | 148.3 | 1022 | 0.0 |
| 20/80 | 147.0 | 1014 | 132.7 | 915 | 9.7 |
| 19/81 | 146.8 | 1012 | 132.0 | 910 | 10.1 |
| 77/23 | 143.4 | 989 | 128.7 | 887 | 10.3 |
| 76/24 | 144.0 | 993 | 131.0 | 903 | 9.0 |
| N(CF$_3$)$_3$/HFC-236cb | | | | | |
| 88.2/11.8 | 46.2 | 319 | 46.2 | 319 | 0.0 |
| 99/1 | 45.9 | 316 | 45.9 | 316 | 0.0 |
| 60/40 | 44.8 | 309 | 44.3 | 305 | 1.1 |
| 40/60 | 42.4 | 292 | 41.1 | 283 | 3.1 |
| 20/80 | 39.0 | 269 | 37.0 | 255 | 5.1 |
| 1/99 | 34.0 | 234 | 33.7 | 232 | 0.9 |
| N(CF$_3$)$_3$/HFC-236ea | | | | | |
| 82.2/17.8 | 47.4 | 327 | 47.4 | 327 | 0.0 |
| 90/10 | 47.2 | 325 | 47.1 | 325 | 0.2 |
| 99/1 | 46.0 | 317 | 46.0 | 317 | 0.0 |
| 60/40 | 46.1 | 318 | 45.3 | 312 | 1.7 |
| 40/60 | 43.4 | 299 | 40.4 | 279 | 6.9 |
| 33/67 | 42.1 | 290 | 38.0 | 262 | 9.7 |
| 32/68 | 41.9 | 289 | 37.7 | 260 | 10.0 |
| N(CF$_3$)$_3$/HFC-236fa | | | | | |
| 66.9/33.1 | 50.0 | 345 | 50.0 | 345 | 0.0 |
| 85/15 | 49.0 | 338 | 48.7 | 336 | 0.6 |
| 99/1 | 46.1 | 318 | 46.0 | 317 | 0.2 |
| 40/60 | 48.5 | 334 | 47.7 | 329 | 1.6 |
| 20/80 | 45.4 | 313 | 43.4 | 299 | 4.4 |
| 1/99 | 39.8 | 274 | 39.5 | 272 | 0.8 |
| N(CF$_3$)$_3$/HFC-245fa | | | | | |
| 99.2/0.8 | 45.8 | 316 | 45.8 | 316 | 0.0 |
| 80/20 | 44.3 | 305 | 43.7 | 301 | 1.4 |
| 60/40 | 41.3 | 285 | 38.7 | 267 | 6.3 |
| 55/45 | 40.4 | 279 | 37.0 | 255 | 8.4 |
| 50/50 | 39.5 | 272 | 35.1 | 242 | 11.1 |
| 52/48 | 39.9 | 275 | 35.9 | 248 | 10.0 |
| N(CF$_3$)$_3$/HFC-254ca | | | | | |
| 99.5/0.5 | 45.8 | 316 | 45.8 | 316 | 0.0 |
| 70/30 | 41.6 | 287 | 38.8 | 268 | 6.7 |
| 65/35 | 40.8 | 281 | 36.9 | 254 | 9.6 |
| 64/36 | 40.6 | 280 | 36.5 | 252 | 10.1 |
| N(CF$_3$)$_3$/HFC-254cb | | | | | |
| 79.5/20.5 | 48.4 | 334 | 48.4 | 334 | 0.0 |
| 99/1 | 46.1 | 318 | 46.1 | 318 | 0.0 |
| 50/50 | 46.3 | 319 | 44.9 | 310 | 3.0 |
| 30/70 | 43.2 | 298 | 39.8 | 274 | 7.9 |
| 25/75 | 42.2 | 291 | 38.5 | 265 | 8.8 |
| 20/80 | 41.0 | 283 | 37.2 | 256 | 9.3 |
| 15/85 | 39.7 | 274 | 36.1 | 249 | 9.1 |
| 1/99 | 34.6 | 239 | 34.2 | 236 | 1.2 |
| N(CF$_3$)$_3$/HFC-254eb | | | | | |
| 78.7/21.3 | 48.5 | 334 | 48.5 | 334 | 0.0 |
| 99/1 | 46.1 | 318 | 46.1 | 318 | 0.0 |
| 50/50 | 46.5 | 321 | 45.3 | 312 | 2.6 |
| 20/80 | 41.4 | 285 | 37.8 | 261 | 8.7 |
| 10/90 | 38.6 | 266 | 35.9 | 248 | 7.0 |
| 1/99 | 35.2 | 243 | 34.8 | 240 | 1.1 |
| N(CF$_3$)$_3$/HFC-263ca | | | | | |
| 92.7/7.3 | 46.8 | 323 | 46.8 | 323 | 0.0 |
| 99/1 | 46.1 | 318 | 46.1 | 318 | 0.0 |
| 60/40 | 42.9 | 296 | 38.6 | 266 | 10.0 |
| N(CF$_3$)$_3$/HFC-263fb | | | | | |
| 49.1/50.9 | 58.0 | 400 | 58.0 | 400 | 0.0 |
| 20/80 | 56.5 | 390 | 56.2 | 387 | 0.5 |
| 1/99 | 54.2 | 374 | 54.1 | 373 | 0.2 |
| 80/20 | 55.2 | 381 | 54.1 | 373 | 2.0 |
| 99/1 | 46.6 | 321 | 46.3 | 319 | 0.6 |
| N(CF$_3$)$_3$/HFC-272ca | | | | | |

-continued

| Refrigerant Composition | 0 wt % evaporated psia | kPa | 50 wt % evaporated psia | kPa | 0% change in vapor pressure |
|---|---|---|---|---|---|
| 78.3/21.7 | 52.9 | 365 | 52.9 | 365 | 0.0 |
| 99/1 | 46.8 | 323 | 46.4 | 320 | 0.9 |
| 50/50 | 50.7 | 350 | 47.6 | 328 | 6.1 |
| 45/55 | 50.1 | 345 | 45.4 | 313 | 9.4 |
| 44/56 | 49.9 | 344 | 44.9 | 310 | 10.0 |
| $N(CF_3)_3$/HFC-272ea | | | | | |
| 90.2/9.8 | 48.3 | 333 | 48.3 | 333 | 0.0 |
| 99/1 | 46.5 | 321 | 46.3 | 319 | 0.4 |
| 60/40 | 45.1 | 311 | 39.9 | 275 | 11.5 |
| 62/38 | 45.3 | 312 | 41.2 | 284 | 9.1 |
| 61/39 | 45.2 | 312 | 40.6 | 280 | 10.2 |
| $N(CF_3)_3$/HFC-272fb | | | | | |
| 86.2/13.8 | 49.6 | 342 | 49.6 | 342 | 0.0 |
| 99/1 | 46.6 | 321 | 46.3 | 319 | 0.6 |
| 50/50 | 45.7 | 315 | 38.3 | 264 | 16.2 |
| 55/45 | 46.4 | 320 | 41.6 | 287 | 10.3 |
| 56/44 | 46.6 | 321 | 42.2 | 291 | 9.4 |
| $N(CF_3)_3$/HFC-281ea | | | | | |
| 71.2/28.8 | 59.3 | 409 | 59.3 | 409 | 0.0 |
| 85/15 | 58.0 | 400 | 57.0 | 393 | 1.7 |
| 99/1 | 47.6 | 328 | 46.7 | 322 | 1.9 |
| 40/60 | 56.9 | 392 | 54.1 | 373 | 4.9 |
| 30/70 | 55.3 | 381 | 51.4 | 354 | 7.1 |
| 20/80 | 53.3 | 367 | 49.2 | 339 | 7.7 |
| 1/99 | 47.5 | 328 | 47.2 | 325 | 0.6 |
| 40/60 | 75.4 | 520 | 67.8 | 467 | 10.1 |
| 39/61 | 75.5 | 521 | 69.0 | 476 | 8.6 |
| $N(CF_3)_3$/HFC-281fa | | | | | |
| 79.3/20.7 | 55.5 | 383 | 55.5 | 383 | 0.0 |
| 99/1 | 47.4 | 327 | 46.7 | 322 | 1.5 |
| 50/50 | 53.0 | 365 | 48.7 | 336 | 8.1 |
| 45/55 | 52.3 | 361 | 46.3 | 319 | 11.5 |
| 47/53 | 52.6 | 363 | 47.3 | 326 | 10.1 |
| 48/52 | 52.7 | 363 | 47.8 | 330 | 9.3 |
| $N(CF_3)_3$/butane | | | | | |
| 89.2/10.8 | 47.8 | 330 | 47.8 | 330 | 0.0 |
| 99/1 | 46.3 | 319 | 46.2 | 319 | 0.2 |
| 60/40 | 44.8 | 309 | 43.3 | 299 | 3.3 |
| 50/50 | 43.4 | 299 | 41.2 | 284 | 5.1 |
| 45/55 | 42.7 | 294 | 40.2 | 277 | 5.9 |
| 40/60 | 41.9 | 289 | 39.3 | 271 | 6.2 |
| 30/70 | 40.4 | 279 | 37.8 | 261 | 6.4 |
| 20/80 | 38.7 | 267 | 36.6 | 252 | 5.4 |
| 10/90 | 37.0 | 255 | 35.8 | 247 | 3.2 |
| 1/99 | 35.4 | 244 | 35.3 | 243 | 0.3 |
| $N(CF_3)_3$/cyclopropane | | | | | |
| 38.3/61.7 | 108.3 | 747 | 108.3 | 747 | 0.0 |
| 15/85 | 107.1 | 738 | 106.6 | 735 | 0.5 |
| 1/99 | 105.2 | 725 | 105.1 | 725 | 0.1 |
| 60/40 | 106.9 | 737 | 105.6 | 728 | 1.2 |
| 80/20 | 100.1 | 690 | 90.6 | 625 | 9.5 |
| 81/19 | 99.3 | 685 | 89.0 | 614 | 10.4 |
| $N(CF_3)_3$/DME | | | | | |
| 59.0/41.0 | 102.9 | 709 | 102.9 | 709 | 0.0 |
| 80/20 | 100.4 | 692 | 94.6 | 652 | 5.8 |
| 83/17 | 99.0 | 683 | 89.9 | 620 | 9.2 |
| 84/16 | 98.4 | 678 | 87.9 | 606 | 10.7 |
| 40/60 | 102.2 | 705 | 99.4 | 685 | 2.7 |
| 30/70 | 101.2 | 698 | 91.5 | 631 | 9.6 |
| 29/71 | 101.0 | 696 | 90.7 | 625 | 10.2 |
| $N(CF_3)_3$/isobutane | | | | | |
| 61.8/38.2 | 52.5 | 362 | 50.5 | 348 | 3.8 |
| 80/20 | 51.8 | 357 | 51.6 | 356 | 0.4 |
| 90/10 | 50.2 | 346 | 49.8 | 343 | 0.8 |
| 99/1 | 46.5 | 321 | 46.3 | 319 | 0.4 |
| 40/60 | 52.1 | 359 | 52.0 | 359 | 0.2 |
| 20/80 | 51.3 | 354 | 51.2 | 353 | 0.2 |
| 1/99 | 50.5 | 348 | 50.5 | 348 | 0.0 |
| $N(CHF_2)_2(CF_3)$/HFC-245ca | | | | | |
| 50.4/49.6 | 15.0 | 103 | 15.0 | 103 | 0.0 |
| 75/25 | 14.7 | 101 | 14.7 | 101 | 0.0 |
| 99/1 | 14.0 | 97 | 14.0 | 97 | 0.0 |
| 25/75 | 14.8 | 102 | 14.7 | 101 | 0.7 |
| 1/99 | 14.2 | 98 | 14.2 | 98 | 0.0 |
| $N(CHF_2)_2(CF_3)$/HFC-245ea | | | | | |
| 50.5/49.5 | 14.9 | 103 | 14.9 | 103 | 0.0 |
| 25/75 | 14.7 | 101 | 14.7 | 101 | 0.0 |
| 1/99 | 14.2 | 98 | 14.2 | 98 | 0.0 |
| 75/25 | 14.7 | 101 | 14.6 | 101 | 0.7 |
| 99/1 | 14.0 | 97 | 14.0 | 97 | 0.0 |
| $N(CHF_2)_2(CF_3)$/HFC-245eb | | | | | |
| 3.3/96.7 | 16.9 | 117 | 16.9 | 117 | 0.0 |
| 1/99 | 16.9 | 117 | 16.9 | 117 | 0.0 |
| 40/60 | 16.6 | 114 | 16.5 | 114 | 0.6 |
| 70/30 | 15.7 | 108 | 15.5 | 107 | 1.3 |
| 90/10 | 14.6 | 101 | 14.5 | 100 | 0.7 |
| 99/1 | 14.0 | 97 | 14.0 | 97 | 0.0 |
| $N(CHF_2)_2(CF_3)$/HFC-254ca | | | | | |
| 59.1/40.9 | 15.2 | 105 | 15.2 | 105 | 0.0 |
| 80/20 | 14.9 | 103 | 14.9 | 103 | 0.0 |
| 99/1 | 14.0 | 97 | 14.0 | 97 | 0.0 |
| 40/60 | 15.0 | 103 | 15.0 | 103 | 0.0 |
| 20/80 | 14.5 | 100 | 14.4 | 99 | 0.7 |
| 1/99 | 13.8 | 95 | 13.7 | 94 | 0.7 |
| $N(CHF_2)_2(CF_3)$/HFC-263ca | | | | | |
| 27.6/72.4 | 18.6 | 128 | 18.6 | 128 | 0.0 |
| 15/85 | 18.5 | 128 | 18.5 | 128 | 0.0 |
| 1/99 | 18.3 | 126 | 18.3 | 126 | 0.0 |
| 60/40 | 18.0 | 124 | 17.8 | 123 | 1.1 |
| 80/20 | 16.8 | 116 | 16.3 | 112 | 3.0 |
| 99/1 | 14.1 | 97 | 14.0 | 97 | 0.7 |
| $N(CHF_2)_2(CF_3)$/HFC-272ea | | | | | |
| 20.1/79.9 | 20.9 | 144 | 20.9 | 144 | 0.0 |
| 1/99 | 20.8 | 143 | 20.8 | 143 | 0.0 |
| 50/50 | 20.5 | 141 | 20.3 | 140 | 1.0 |
| 80/20 | 18.4 | 127 | 17.4 | 120 | 5.4 |
| 99/1 | 14.3 | 99 | 14.1 | 97 | 1.4 |
| $N(CH_2F)(CF_3)_2$/HFC-245ca | | | | | |
| 54.7/45.3 | 15.0 | 103 | 15.0 | 103 | 0.0 |
| 80/20 | 14.7 | 101 | 14.7 | 101 | 0.0 |
| 99/1 | 14.2 | 98 | 14.2 | 98 | 0.0 |
| 20/80 | 14.6 | 101 | 14.6 | 101 | 0.0 |
| 1/99 | 14.2 | 98 | 14.2 | 98 | 0.0 |
| $N(CH_2F)(CF_3)_2$/HFC-245ea | | | | | |
| 55.2/44.8 | 14.9 | 103 | 14.9 | 103 | 0.0 |
| 80/20 | 14.7 | 101 | 14.7 | 101 | 0.0 |
| 99/1 | 14.2 | 98 | 14.2 | 98 | 0.0 |
| 25/75 | 14.7 | 101 | 14.6 | 101 | 0.7 |
| 1/99 | 14.2 | 98 | 14.2 | 98 | 0.0 |
| $N(CH_2F)(CF_3)_2$/HFC-254ca | | | | | |
| 62.4/37.6 | 15.2 | 105 | 15.2 | 105 | 0.0 |
| 80/20 | 15.0 | 103 | 15.0 | 103 | 0.0 |
| 99/1 | 14.2 | 98 | 14.2 | 98 | 0.0 |
| 40/60 | 15.0 | 103 | 14.9 | 103 | 0.7 |
| 20/80 | 14.5 | 100 | 14.4 | 99 | 0.7 |
| 1/99 | 13.8 | 95 | 13.7 | 94 | 0.7 |
| $N(CH_2F)(CF_3)_2$/HFC-263ca | | | | | |
| 26.5/73.5 | 18.5 | 128 | 18.5 | 128 | 0.0 |
| 1/99 | 18.3 | 126 | 18.3 | 126 | 0.0 |
| 60/40 | 18.0 | 124 | 17.8 | 123 | 1.1 |
| 80/20 | 16.8 | 116 | 16.4 | 113 | 2.4 |
| 99/1 | 14.4 | 99 | 14.3 | 99 | 0.7 |
| $N(CH_2F)(CF_3)_2$/HFC-272ea | | | | | |
| 17/83 | 20.9 | 144 | 20.9 | 144 | 0.0 |
| 1/99 | 20.8 | 143 | 20.8 | 143 | 0.0 |
| 50/50 | 20.4 | 141 | 20.2 | 139 | 1.0 |
| 80/20 | 18.4 | 127 | 17.5 | 121 | 4.9 |
| 99/1 | 14.5 | 100 | 14.3 | 99 | 1.4 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Refrigerant Performance

The following table shows the performance of various refrigerants in an ideal vapor compression cycle. The data are based on the following conditions.

| | |
|---|---|
| Evaporator temperature | 45.0° F. (7.2° C.) |
| Condenser temperature | 130.0° F. (54.4° C.) |
| Liquid subcooled | 15° F. (8.3° C.) |
| Return Gas | 75° F. (23.9° C.) |
| Compressor efficiency is 75%. | |

The refrigeration capacity is based on a compressor with a fixed displacement of 3.5 cubic feet per minute and 75% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Refrig. Comp. | Evap. Press. Psia | kPa | Cond. Press. Psia | kPa | Comp. Dis. Temp. °F. | °C. | COP | Capacity BTU/min | kw |
|---|---|---|---|---|---|---|---|---|---|
| N(CF$_3$)$_3$/HFC-23 | | | | | | | | | |
| *1/99 | 99.4 | 685 | 547.0 | 3771 | 185.4 | 85.2 | 1.90 | 314.1 | 5.5 |
| *4.3/95.7 | 87.3 | 602 | 527.6 | 3638 | 191.8 | 88.8 | 1.86 | 285.3 | 5.0 |
| **99/1 | 29.0 | 200 | 121.7 | 839 | 142.0 | 61.1 | 3.26 | 113.4 | 2.0 |

*condenser temp. = 60° F. (15.6° C.), Evaporator temp. = −40° F. (−40.0° C.), Subcool temp. = 50/50° F. (8.3° C.), Return gas temp. = −20° F/ (−28.9° C.).
**Return gas = 75° F. (23.9° C.).

| Refrig. Comp. | Evap. Press. Psia | kPa | Cond. Press. Psia | kPa | Comp. Dis. Temp. °F. | °C. | COP | Capacity BTU/min | kw |
|---|---|---|---|---|---|---|---|---|---|
| N(CF$_3$)$_3$/HFC-32 | | | | | | | | | |
| *1/99 | 150.4 | 1037 | 451.4 | 3112 | 194.8 | 90.4 | 3.68 | 543.5 | 9.6 |
| 35.0/65.0 | 164.6 | 1135 | 464.0 | 3199 | 177.1 | 80.6 | 3.41 | 504.4 | 8.9 |
| 99/1 | 31.3 | 216 | 128.0 | 883 | 141.8 | 61.0 | 3.43 | 126.0 | 2.2 |

*Condenser temp. 120° F. (48.9° C.), Subcool temp. 15° F. (8.3° C.).

| Refrig. Comp. | Evap. Press. Psia | kPa | Cond. Press. Psia | kPa | Comp. Dis. Temp. °F. | °C. | COP | Capacity BTU/min | kw |
|---|---|---|---|---|---|---|---|---|---|
| N(CF$_3$)$_3$/HFC-134a | | | | | | | | | |
| 1/99 | 54.8 | 378 | 214.8 | 1481 | 180.7 | 82.6 | 3.33 | 218.8 | 3.9 |
| 27.7/72.3 | 59.3 | 409 | 225.7 | 1556 | 170.6 | 77.0 | 3.17 | 215.6 | 3.8 |
| 99/1 | 26.4 | 182 | 114.4 | 789 | 141.9 | 61.1 | 3.02 | 98.2 | 1.7 |
| N(CF$_3$)$_3$/HFC-152a | | | | | | | | | |
| 1/99 | 51.0 | 352 | 193.9 | 1337 | 214.0 | 101.1 | 3.52 | 219.0 | 3.9 |
| 49.2/50.8 | 48.0 | 331 | 213.2 | 1470 | 181.8 | 83.2 | 3.28 | 216.4 | 3.8 |
| 99/1 | 26.9 | 185 | 115.9 | 799 | 142.3 | 61.3 | 3.06 | 100.9 | 1.8 |
| N(CF$_3$)$_3$/HFC-161 | | | | | | | | | |
| 1/99 | 79.9 | 551 | 280.4 | 1933 | 211.1 | 99.5 | 3.40 | 309.0 | 5.4 |
| 45.7/54.3 | 86.1 | 594 | 295.4 | 2037 | 188.0 | 86.7 | 3.17 | 294.8 | 5.2 |
| 99/1 | 28.5 | 197 | 120.9 | 834 | 142.6 | 61.4 | 3.16 | 109.0 | 1.9 |
| N(CF$_3$)$_3$/HFC-236cb | | | | | | | | | |
| 1/99 | 18.3 | 126 | 79.9 | 551 | 155.4 | 68.6 | 3.41 | 80.5 | 1.4 |
| 88.2/11.8 | 24.2 | 167 | 105.2 | 725 | 142.9 | 61.6 | 3.07 | 92.3 | 1.6 |
| 99/1 | 25.2 | 174 | 109.8 | 757 | 141.4 | 60.8 | 2.99 | 93.3 | 1.6 |
| N(CF$_3$)$_3$/HFC-236ea | | | | | | | | | |
| 1/99 | 15.3 | 105 | 70.4 | 485 | 160.2 | 71.2 | 3.49 | 72.0 | 1.3 |
| 82.2/17.8 | 23.2 | 160 | 102.0 | 703 | 144.5 | 62.5 | 3.13 | 91.3 | 1.6 |
| 99/1 | 25.2 | 174 | 109.8 | 757 | 141.4 | 60.8 | 2.99 | 93.3 | 1.6 |
| N(CF$_3$)$_3$/HFC-236fa | | | | | | | | | |
| 1/99 | 20.2 | 139 | 869.0 | 5992 | 154.9 | 68.3 | 3.39 | 87.0 | 1.5 |
| 66.9/33.1 | 23.3 | 161 | 100.9 | 696 | 145.9 | 63.3 | 3.17 | 92.3 | 1.6 |
| 1/99 | 25.3 | 174 | 109.9 | 758 | 141.4 | 60.8 | 2.99 | 93.4 | 1.6 |
| N(CF$_3$)$_3$/HFC-245fa | | | | | | | | | |
| 1/99 | 11.3 | 78 | 54.2 | 374 | 164.7 | 73.7 | 3.60 | 56.8 | 1.0 |
| 99.2/0.8 | 25.2 | 174 | 109.7 | 756 | 141.5 | 60.8 | 2.99 | 93.1 | 1.6 |
| N(CF$_3$)$_3$/HFC-254ca | | | | | | | | | |
| 1/99 | 6.9 | 48 | 35.7 | 246 | 171.4 | 77.4 | 3.72 | 38.0 | 0.7 |
| 99.5/0.5 | 25.1 | 173 | 109.8 | 757 | 141.5 | 60.8 | 2.98 | 93.0 | 1.6 |
| N(CF$_3$)$_3$/HFC-254cb | | | | | | | | | |
| 1/99 | 18.6 | 128 | 80.2 | 553 | 164.4 | 73.6 | 3.53 | 85.1 | 1.5 |
| 79.5/20.5 | 24.6 | 170 | 105.4 | 727 | 146.4 | 63.6 | 3.16 | 96.4 | 1.7 |
| 99/1 | 25.4 | 175 | 110.1 | 759 | 141.5 | 60.8 | 2.99 | 93.7 | 1.6 |
| N(CF$_3$)$_3$/HFC-254eb | | | | | | | | | |
| 1/99 | 19.0 | 131 | 81.4 | 561 | 164.3 | 73.5 | 3.53 | 86.4 | 1.5 |
| 78.7/21.3 | 24.7 | 170 | 105.6 | 728 | 146.6 | 63.7 | 3.16 | 96.9 | 1.7 |
| 99/1 | 25.4 | 175 | 110.1 | 759 | 141.5 | 60.8 | 2.99 | 93.7 | 1.6 |
| N(CF$_3$)$_3$/HFC-263ca | | | | | | | | | |
| 1/99 | 9.5 | 66 | 45.2 | 312 | 172.3 | 77.9 | 3.70 | 49.5 | 0.9 |
| 92.7/7.3 | 23.6 | 163 | 103.0 | 710 | 143.7 | 62.1 | 3.12 | 91.9 | 1.6 |
| 99/1 | 25.1 | 173 | 109.4 | 754 | 141.6 | 60.9 | 2.99 | 93.1 | 1.6 |
| N(CF$_3$)$_3$/HFC-263fb | | | | | | | | | |
| 1/99 | 30.6 | 211 | 120.2 | 829 | 164.6 | 73.7 | 3.45 | 126.6 | 2.2 |
| 49.1/50.9 | 31.2 | 215 | 124.7 | 860 | 155.0 | 68.3 | 3.28 | 122.0 | 2.1 |
| 99/1 | 25.6 | 177 | 111.1 | 766 | 141.7 | 60.9 | 2.98 | 94.3 | 1.7 |
| N(CF$_3$)$_3$/HFC-272ca | | | | | | | | | |
| 1/99 | 19.2 | 132 | 78.8 | 543 | 170.3 | 76.8 | 3.63 | 87.8 | 1.5 |
| 78.3/21.7 | 25.5 | 176 | 106.2 | 732 | 149.5 | 65.3 | 3.25 | 101.5 | 1.8 |
| 99/1 | 25.5 | 176 | 110.4 | 761 | 141.7 | 60.9 | 3.00 | 94.1 | 1.7 |

-continued

| Refrig. Comp. | Evap. Press. | | Cond. Press. | | Comp. Dis. Temp. | | COP | Capacity BTU/min | kw |
|---|---|---|---|---|---|---|---|---|---|
| | Psia | kPa | Psia | kPa | °F. | °C. | | | |
| N(CF$_3$)$_3$/HFC-272ea | | | | | | | | | |
| 1/99 | 10.9 | 75 | 51.4 | 354 | 181.0 | 82.8 | 3.74 | 57.4 | 1.0 |
| 90.2/9.8 | 24.8 | 171 | 106.5 | 734 | 145.8 | 63.2 | 3.14 | 96.6 | 1.7 |
| 99/1 | 25.4 | 175 | 110.2 | 760 | 141.7 | 60.9 | 3.00 | 94.0 | 1.7 |
| N(CF$_3$)$_3$/HFC-272fb | | | | | | | | | |
| 1/99 | 14.1 | 97 | 63.9 | 441 | 178.6 | 81.4 | 3.70 | 71.2 | 1.3 |
| 86.2/13.8 | 25.6 | 177 | 108.7 | 749 | 147.5 | 64.2 | 3.17 | 100.3 | 1.8 |
| 99/1 | 25.5 | 176 | 110.6 | 763 | 141.7 | 60.9 | 3.00 | 94.3 | 1.7 |
| N(CF$_3$)$_3$/HFC-281ea | | | | | | | | | |
| 1/99 | 26.6 | 183 | 105.2 | 725 | 177.9 | 81.1 | 3.61 | 118.3 | 2.1 |
| 71.2/28.8 | 31.8 | 219 | 126.1 | 869 | 156.2 | 69.0 | 3.30 | 124.6 | 2.2 |
| 99/1 | 25.9 | 179 | 112.3 | 774 | 142.1 | 61.2 | 2.99 | 95.6 | 1.7 |
| N(CF$_3$)$_3$/HFC-281fa | | | | | | | | | |
| 1/99 | 20.8 | 143 | 87.0 | 600 | 179.5 | 81.9 | 3.65 | 97.6 | 1.7 |
| 79.3/20.7 | 28.8 | 199 | 117.9 | 813 | 152.7 | 67.1 | 3.25 | 113.3 | 2.0 |
| 99/1 | 25.8 | 178 | 111.7 | 770 | 142.0 | 61.1 | 2.99 | 95.2 | 1.7 |
| N(CF$_3$)$_3$/butane | | | | | | | | | |
| 1/99 | 19.6 | 135 | 80.9 | 558 | 165.3 | 74.1 | 3.57 | 88.3 | 1.6 |
| 89.2/10.8 | 26.0 | 179 | 109.3 | 754 | 145.9 | 63.3 | 3.15 | 100.2 | 1.8 |
| 99/1 | 25.5 | 176 | 110.5 | 762 | 141.7 | 60.9 | 3.00 | 94.4 | 1.7 |
| N(CF$_3$)$_3$/cyclopropane | | | | | | | | | |
| 1/99 | 62.7 | 432 | 215.4 | 1485 | 209.5 | 98.6 | 3.59 | 254.0 | 4.5 |
| 38.3/61.7 | 69.0 | 476 | 234.6 | 1618 | 192.5 | 89.2 | 3.45 | 260.0 | 4.6 |
| 99/1 | 28.3 | 195 | 119.9 | 827 | 142.7 | 61.5 | 3.13 | 107.3 | 1.9 |
| N(CF$_3$)$_3$/DME | | | | | | | | | |
| 1/99 | 48.7 | 336 | 182.8 | 1260 | 203.4 | 95.2 | 3.60 | 210.7 | 3.7 |
| 59.0/41.0 | 61.4 | 423 | 221.6 | 1528 | 175.7 | 79.8 | 3.25 | 222.9 | 3.9 |
| 99/1 | 28.1 | 194 | 119.4 | 823 | 142.5 | 61.4 | 3.12 | 106.3 | 1.9 |
| N(CF$_3$)$_3$/isobutane | | | | | | | | | |
| 1/99 | 29.1 | 201 | 110.3 | 760 | 162.0 | 72.2 | 3.47 | 118.3 | 2.1 |
| 61.8/38.2 | 29.3 | 202 | 115.4 | 796 | 153.5 | 67.5 | 3.31 | 114.8 | 2.0 |
| 99/1 | 25.6 | 177 | 110.9 | 765 | 141.8 | 61.0 | 2.99 | 94.6 | 1.7 |
| N(CHF$_2$)$_2$(CF$_3$)/HFC-245ca | | | | | | | | | |
| 1/99 | 7.0 | 48 | 36.6 | 252 | 168.1 | 75.6 | 3.67 | 38.3 | 0.7 |
| 50.4/49.6 | 7.0 | 48 | 37.6 | 259 | 161.2 | 71.8 | 3.61 | 37.9 | 0.7 |
| 99/1 | 6.7 | 46 | 38.1 | 263 | 153.8 | 67.7 | 3.52 | 36.5 | 0.6 |
| N(CHF$_2$)$_2$(CF$_3$)/HFC-245ea | | | | | | | | | |
| 1/99 | 6.9 | 48 | 37.2 | 256 | 173.1 | 78.4 | 3.69 | 38.9 | 0.7 |
| 50.5/49.5 | 7.0 | 48 | 38.2 | 263 | 163.5 | 73.1 | 3.62 | 38.5 | 0.7 |
| 99/1 | 6.7 | 46 | 38.1 | 263 | 153.9 | 67.7 | 3.52 | 36.5 | 0.6 |
| N(CHF$_2$)$_2$(CF$_3$)/HFC-245eb | | | | | | | | | |
| 1/99 | 8.5 | 59 | 42.9 | 296 | 166.7 | 74.8 | 3.64 | 44.9 | 0.8 |
| 3.3/96.7 | 8.4 | 58 | 42.8 | 295 | 166.5 | 74.7 | 3.64 | 44.7 | 0.8 |
| 99/1 | 6.8 | 47 | 38.1 | 263 | 153.8 | 67.7 | 3.52 | 36.6 | 0.6 |
| N(CHF$_2$)$_2$(CF$_3$)/HFC-254ca | | | | | | | | | |
| 1/99 | 6.7 | 46 | 35.2 | 243 | 171.7 | 77.6 | 3.70 | 37.3 | 0.7 |
| 59.1/40.9 | 6.9 | 48 | 37.2 | 256 | 161.9 | 72.2 | 3.61 | 37.5 | 0.7 |
| 99/1 | 6.7 | 46 | 38.1 | 263 | 153.9 | 67.7 | 3.53 | 36.5 | 0.6 |
| N(CHF$_2$)$_2$(CF$_3$)/HFC-263ca | | | | | | | | | |
| 1/99 | 9.3 | 64 | 44.7 | 308 | 172.5 | 78.1 | 3.69 | 48.9 | 0.9 |
| 27.6/72.4 | 8.9 | 61 | 44.0 | 303 | 168.6 | 75.9 | 3.66 | 47.0 | 0.8 |
| 99/1 | 6.8 | 47 | 38.2 | 263 | 154.0 | 67.8 | 3.52 | 36.7 | 0.6 |
| N(CHF$_2$)$_2$(CF$_3$)/HFC-272ea | | | | | | | | | |
| 1/99 | 10.7 | 74 | 50.8 | 350 | 181.2 | 82.9 | 3.72 | 56.4 | 1.0 |
| 20.1/79.9 | 10.5 | 72 | 50.5 | 348 | 177.3 | 80.7 | 3.70 | 55.2 | 1.0 |
| 99/1 | 6.8 | 47 | 38.5 | 265 | 154.2 | 67.9 | 3.52 | 37.0 | 0.7 |
| N(CH$_2$F)(CF$_3$)$_2$/HFC-245ca | | | | | | | | | |
| 1/99 | 7.0 | 48 | 36.6 | 252 | 168.1 | 75.6 | 3.67 | 38.3 | 0.7 |
| 54.7/45.3 | 7.2 | 50 | 38.1 | 263 | 158.5 | 70.3 | 3.58 | 38.3 | 0.7 |
| 99/1 | 6.9 | 48 | 38.1 | 263 | 150.4 | 65.8 | 3.49 | 36.5 | 0.6 |
| N(CH$_2$F)(CF$_3$)$_2$/HFC-245ea | | | | | | | | | |
| 1/99 | 6.9 | 48 | 37.2 | 256 | 173.1 | 78.4 | 3.69 | 38.9 | 0.7 |
| 55.2/44.8 | 7.2 | 50 | 38.8 | 268 | 160.4 | 71.3 | 3.59 | 38.9 | 0.7 |
| 99/1 | 6.9 | 48 | 38.2 | 263 | 150.5 | 65.8 | 3.49 | 36.5 | 0.6 |
| N(CH$_2$F)(CF$_3$)$_2$/HFC-254ca | | | | | | | | | |
| 1/99 | 6.7 | 46 | 35.2 | 243 | 171.6 | 77.6 | 3.70 | 37.3 | 0.7 |
| 62.4/37.6 | 7.1 | 49 | 37.8 | 261 | 159.0 | 70.6 | 3.59 | 38.0 | 0.7 |
| 99/1 | 6.9 | 48 | 38.1 | 263 | 150.5 | 65.8 | 3.49 | 36.5 | 0.6 |
| N(CH$_2$F)(CF$_3$)$_2$/HFC-263ca | | | | | | | | | |
| 1/99 | 9.4 | 65 | 44.8 | 309 | 172.5 | 78.1 | 3.69 | 48.9 | 0.9 |
| 26.5/73.5 | 9.1 | 63 | 44.5 | 307 | 167.7 | 75.4 | 3.66 | 47.5 | 0.8 |
| 99/1 | 7.0 | 48 | 38.3 | 264 | 150.6 | 65.9 | 3.49 | 36.7 | 0.6 |
| N(CH$_2$F)(CF$_3$)$_2$/HFC-272ea | | | | | | | | | |
| 1/99 | 10.7 | 74 | 50.9 | 351 | 181.2 | 82.9 | 3.72 | 56.5 | 1.0 |

| Refrig. Comp. | Evap. Press. Psia | kPa | Cond. Press. Psia | kPa | Comp. Dis. Temp. °F. | °C. | COP | Capacity BTU/min | kw |
|---|---|---|---|---|---|---|---|---|---|
| 17.0/83.0 | 10.7 | 74 | 51.0 | 352 | 177.3 | 80.7 | 3.70 | 55.9 | 1.0 |
| 99/1 | 7.1 | 49 | 38.6 | 266 | 150.7 | 65.9 | 3.49 | 37.1 | 0.7 |

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

ADDITIONAL COMPOUNDS

Other components, such as aliphatic hydrocarbons having a boiling point of −60° to +30° C., hydrofluorocarbonalkanes having a boiling point of −60° to +30° C., hydrofluoropropanes having a boiling point of between −60° to +30° C., hydrocarbon esters having a boiling point between −60° to +30° C., hydrochlorofluorocarbons having a boiling point between −60° to +30° C., hydrofluorocarbons having a boiling point of −60° to +30° C., hydrochlorocarbons having a boiling point between −60° to +30° C., chlorocarbons and perfluorinated compounds, can be added to the azeotropic or azeotrope-like compositions described above.

Additives such as lubricants, corrosion inhibitors, stabilizers, dyes and other appropriate materials may be added to the novel compositions of the invention for a variety of purposes provides they do not have an adverse influence on the composition for its intended application. Preferred lubricants include esters having a molecular weight greater than 250.

I claim:

1. An azeotropic or azeotrope-like composition consisting essentially of 1–47 weight percent tris(trifluoromethyl)amine and 53–99 weight percent trifluoromethane, wherein when the temperature is adjusted to about 25° C., the vapor pressure is about 643–669 psia; 20–74 weight percent tris(trifluoromethyl)amine and 26–80 weight percent difluoromethane, wherein when the temperature is adjusted to about 25° C., the vapor pressure is about 273–277 psia; 1–66 weight percent tris(trifluoromethyl)amine and 34–99 weight percent 1,1,1,2-tetrafluoroethane, wherein when the temperature is adjusted to about 25° C., the vapor pressure is about 97–104 psia; 1– 78 weight percent tris(trifluoromethyl)amine and 22–99 weight percent 1,1-difluoroethane, wherein when the temperature is adjusted to about 25° C., the vapor pressure is about 87–101 psia; 20–76 weight percent tris(trifluoromethyl)amine and 24–80 weight percent monofluoroethane, wherein when the temperature is adjusted to about 25° C., the vapor pressure is about 147–148 psia; 1–99 weight percent tris(trifluoromethyl)amine and 1–99 weight percent 1,1,1,2,2,3-hexafluoropropane, wherein when the temperature is adjusted to about 25° C., the vapor pressure is about 34–46 psia; 32–99 weight percent tris(trifluoromethyl)amine and 1–68 weight percent 1,1,2,3,3,3-hexafluoropropane, wherein when the temperature is adjusted to about 25° C., the vapor pressure is about 42–47 psia; 1–99 weight percent tris(trifluoromethyl)amine and 1–99 weight percent 1,1,1,3,3,3-hexafluoropropane, wherein when the temperature is adjusted to about 25° C., the vapor pressure is about 40–50 psia; 52–99.2 weight percent tris(trifluoromethyl)amine and 0.8–48 weight percent 1,1,1,3,3-pentafluoropropane, wherein when the temperature is adjusted to about 25° C., the vapor pressure is about 39–46 psia; 65–99.5 weight percent tris(trifluoromethyl)amine and 0.5–35 weight percent 1,2,2,3-tetrafluoropropane, wherein when the temperature is adjusted to about 25° C., the vapor pressure is about 41–46 psia; 1–99 weight percent tris(trifluoromethyl)amine and 1–99 weight percent 1,1,2,2-tetrafluoropropane, wherein when the temperature is adjusted to about 25° C., the vapor pressure is about 34–48 psia; 1–99 weight percent tris(trifluoromethyl)amine and 1–99 weight percent 1,1,1,2-tetrafluoropropane, wherein when the temperature is adjusted to about 25° C., the vapor pressure is about 35–49 psia; 60–99 weight percent tris(trifluoromethyl)amine and 1–40 weight percent 1,2,2-trifluoropropane, wherein when the temperature is adjusted to about 25° C., the vapor pressure is about 43–47 psia; 1–99 weight percent tris(trifluoromethyl)amine and 1–99 weight percent 1,1,1-trifluoropropane, wherein when the temperature is adjusted to about 25° C., the vapor pressure is about 46–58 psia; 44–99 weight percent tris(trifluoromethyl)amine and 1–56 weight percent 2,2-difluoropropane, wherein when the temperature is adjusted to about 25° C., the vapor pressure is about 47–53 psia; 62–99 weight percent tris(trifluoromethyl)amine and 1–38 weight percent 1,2-difluoropropane, wherein when the temperature is adjusted to about 25° C., the vapor pressure is about 45–48 psia; 56–99 weight percent tris(trifluoromethyl)amine and 1–44 weight percent 1,1-difluoropropane, wherein when the temperature is adjusted to about 25° C., the vapor pressure is about 46–50 psia; 39–99 weight percent tris(trifluoromethyl)amine and 1–61 weight percent 2-fluoropropane, wherein when the temperature is adjusted to about 25° C., the vapor pressure is about 48–76 psia; 48–99 weight percent tris(trifluoromethyl)amine and 1–52 weight percent 1-fluoropropane, wherein when the temperature is adjusted to about 25° C., the vapor pressure is about 47–56 psia; 1–99 weight percent bis(difluoromethyl)trifluoromethylamine and 1–99 weight percent 1,1,2,2,3-pentafluoropropane, wherein when the temperature is adjusted to about 25° C., the vapor pressure is about 14–15 psia; 1–99 weight percent bis(difluoromethyl)trifluoromethylamine and 1–99 weight percent 1,1,2,3,3-pentafluoropropane, wherein when the temperature is adjusted to about 25° C., the vapor pressure is about 14–15 psia; 1–99 weight percent bis(difluoromethyl)trifluoromethylamine and 1–99 weight percent 1,2,2,3-tetrafluoropropane, wherein when the temperature is adjusted to about 25° C., the vapor pressure is about 14–15 psia; 1-99 weight percent bis(difluoromethyl)trifluoromethylamine and 1-99 weight percent 1,2,2-trifluoropropane, wherein when the temperature is adjusted to about 25° C., the vapor pressure is about 14-19 psia; 1-99 weight percent bis(difluoromethyl)trifluoromethylamine and 1-99 weight percent 1,2-difluoropropane, wherein when the temperature is adjusted to about 25° C., the vapor pressure is about 14-21 psia; 1-99 weight percent fluoromethylbis(trifluoromethyl)amine and 1-99 weight percent 1,1,2,2,3-pentafluoropropane, wherein when the temperature is adjusted to about 25° C., the vapor pressure is about 14-15 psia; 1-99 weight percent fluoromethylbis(trifluoromethyl)amine and 1-99 weight percent 1,1,2,3,3-pentafluoropropane, wherein when the temperature is adjusted to about 25° C., the vapor pressure is about 14-15 psia; 1-99 weight percent fluoromethylbis(trifluoromethyl)amine and 1-99 weight percent 1,2,2,3-tetrafluoropropane, wherein when the temperature is adjusted to about 25° C., the vapor pressure is about 14-15 psia; 1-99 weight percent fluoromethylbis(trifluoromethyl)amine and 1-99 weight percent 1,2,2-trifluoropropane, wherein when the temperature is adjusted to about 25° C., the vapor pressure is about 14-19 psia; 1-99 weight percent fluoromethylbis(trifluoromethyl)amine and 1-99 weight percent 1,2-difluoropropane, wherein when the temperature is adjusted to about 25° C., the vapor pressure is about 14-21 psia; 1-99 weight percent tris(trifluoromethyl)amine and 1-99 weight percent butane, wherein when the temperature is adjusted to about 25° C., the vapor pressure is about 35-48 psia; 1-80 weight percent tris(trifluoromethyl)amine and 20-99 weight percent cyclopropane, wherein when the temperature is adjusted to about 25° C., the vapor pressure is about 100-108 psia; 30-83 weight percent tris(trifluoromethyl)amine and 17-70 weight percent dimethylether, wherein when the temperature is adjusted to about 25° C., the vapor pressure is about 99-103 psia; or 1-99 weight percent tris(trifluoromethyl)amine and 1-99 weight percent isobutane, wherein when the temperature is adjusted to about 25° C., the vapor pressure is about 46-53 psia; wherein when 50 wt. % of an original composition is evaporated or boiled off, the vapor pressure of the remaining composition is within about 10% of the vapor pressure of the original composition, at a temperature of 25° C.; and wherein each of the azeotropic or azeotrope-like compositions consists essentially of the two named components.

2. A process for producing refrigeration, comprising condensing a composition of claim 1 and thereafter evaporating said composition in the vicinity of the body to be cooled.

3. A process for producing heat comprising evaporating a composition of claim 1, and thereafter condensing said composition in the vicinity of a body to be heated.

* * * * *